(12) United States Patent
Hua et al.

(10) Patent No.: US 10,593,507 B2
(45) Date of Patent: Mar. 17, 2020

(54) SMALL PORTABLE NIGHT VISION SYSTEM

(71) Applicant: ARIZONA BOARD OF REGENTS ON BEHALF OF THE UNIVERSITY OF ARIZONA, Tucson, AZ (US)

(72) Inventors: Hong Hua, Tucson, AZ (US); Stanley K. Pau, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/217,158

(22) Filed: Dec. 12, 2018

(65) Prior Publication Data

US 2019/0122849 A1    Apr. 25, 2019

Related U.S. Application Data

(62) Division of application No. 15/017,763, filed on Feb. 8, 2016, now Pat. No. 10,176,961.

(60) Provisional application No. 62/113,656, filed on Feb. 9, 2015.

(51) Int. Cl.
*G02B 17/08* (2006.01)
*H01J 31/50* (2006.01)
*G02B 23/12* (2006.01)

(52) U.S. Cl.
CPC .......... *H01J 31/507* (2013.01); *G02B 17/086* (2013.01); *G02B 23/125* (2013.01)

(58) Field of Classification Search
CPC .. G02B 27/0172; G02B 17/086; H01J 31/507
See application file for complete search history.

(56) References Cited

U.S. PATENT DOCUMENTS

| | | |
|---|---|---|
| 3,632,184 A | 1/1972 | King |
| 3,992,084 A | 11/1976 | Nakamura |
| 4,468,101 A | 8/1984 | Ellis |
| 4,669,810 A | 6/1987 | Wood |
| 4,753,522 A | 6/1988 | Nishina |
| 4,863,251 A | 9/1989 | Herloski |
| 5,109,469 A | 4/1992 | Duggan |
| 5,172,272 A | 12/1992 | Aoki |
| 5,172,275 A | 12/1992 | Dejager |
| 5,416,315 A | 5/1995 | Filipovich |
| 5,436,763 A | 7/1995 | Chen |
| 5,526,183 A | 6/1996 | Chen |

(Continued)

FOREIGN PATENT DOCUMENTS

| | | |
|---|---|---|
| CN | 1252133 A | 5/2000 |
| CN | 101359089 A | 2/2009 |

(Continued)

OTHER PUBLICATIONS

US 9,207,443 B2, 12/2015, Cheng (withdrawn)

(Continued)

*Primary Examiner* — Thanh Luu
(74) *Attorney, Agent, or Firm* — Niels Haun; Dann, Dorfman, Herrell & Skillman, P.C.

(57) ABSTRACT

Night vision systems that are compact in size due to one or more of the design of the optical system and light detector module.

9 Claims, 6 Drawing Sheets

(56) References Cited

U.S. PATENT DOCUMENTS

| | | |
|---|---|---|
| 5,572,229 A | 11/1996 | Fisher |
| 5,621,572 A | 4/1997 | Fergason |
| 5,625,495 A | 4/1997 | Moskovich |
| 5,699,194 A | 12/1997 | Takahashi |
| 5,701,202 A | 12/1997 | Takahashi |
| 5,706,136 A | 1/1998 | Okuyama |
| 5,818,632 A | 10/1998 | Stephenson |
| 5,880,711 A | 3/1999 | Tamada |
| 5,917,656 A | 6/1999 | Hayakawa |
| 5,959,780 A | 9/1999 | Togino |
| 6,008,781 A | 12/1999 | Furness |
| 6,023,373 A | 2/2000 | Inoguchi |
| 6,028,606 A | 2/2000 | Kolb |
| 6,034,823 A | 3/2000 | Togino |
| 6,198,577 B1 | 3/2001 | Kedar |
| 6,201,646 B1 | 3/2001 | Togino |
| 6,236,521 B1 | 5/2001 | Nanba |
| 6,239,915 B1 | 5/2001 | Takagi |
| 6,243,199 B1 | 6/2001 | Hansen |
| 6,271,972 B1 | 8/2001 | Kedar |
| 6,384,983 B1 | 5/2002 | Yamazaki |
| 6,396,639 B1 | 5/2002 | Togino |
| 6,404,561 B1 | 6/2002 | Isono |
| 6,404,562 B1 | 6/2002 | Ota |
| 6,433,376 B2 | 8/2002 | Kim |
| 6,433,760 B1 | 8/2002 | Vaissie |
| 6,493,146 B2 | 12/2002 | Inoguchi |
| 6,510,006 B1 | 1/2003 | Togino |
| 6,563,648 B2 | 5/2003 | Gleckman |
| 6,646,811 B2 | 11/2003 | Inoguchi |
| 6,653,989 B2 | 11/2003 | Nakanishi |
| 6,671,099 B2 | 12/2003 | Nagata |
| 6,731,434 B1 | 5/2004 | Hua |
| 6,829,113 B2 | 12/2004 | Togino |
| 6,963,454 B1 | 11/2005 | Martins |
| 6,999,239 B1 | 2/2006 | Martins |
| 7,152,977 B2 | 12/2006 | Ruda |
| 7,177,083 B2 | 2/2007 | Holler |
| 7,230,583 B2 | 6/2007 | Tidwell |
| 7,249,853 B2 | 7/2007 | Weller-Brophy |
| 7,405,881 B2 | 7/2008 | Shimizu |
| 7,414,791 B2 | 8/2008 | Urakawa |
| 7,522,344 B1 | 4/2009 | Curatu |
| 8,467,133 B2 | 6/2013 | Miller |
| 8,503,087 B1 | 8/2013 | Amirparviz |
| 8,511,827 B2 | 8/2013 | Hua |
| 9,201,193 B1 * | 12/2015 | Smith ............ G02B 6/04 |
| 9,239,453 B2 | 1/2016 | Cheng |
| 9,310,591 B2 | 4/2016 | Hua |
| 9,720,232 B2 | 8/2017 | Hua |
| 9,874,760 B2 | 1/2018 | Hua |
| 10,176,961 B2 * | 1/2019 | Hua ............ H01J 31/507 |
| 2001/0009478 A1 | 7/2001 | Yamazaki |
| 2002/0015116 A1 | 2/2002 | Park |
| 2002/0060850 A1 | 5/2002 | Takeyama |
| 2002/0063913 A1 | 5/2002 | Nakamura |
| 2003/0076591 A1 | 4/2003 | Ohmori |
| 2003/0090753 A1 | 5/2003 | Takeyama |
| 2004/0136097 A1 | 7/2004 | Park |
| 2004/0164927 A1 | 8/2004 | Suyama |
| 2004/0196213 A1 | 10/2004 | Tidwell |
| 2004/0218243 A1 | 11/2004 | Yamazaki |
| 2004/0233551 A1 | 11/2004 | Takahashi |
| 2005/0036119 A1 | 2/2005 | Ruda |
| 2005/0179868 A1 | 8/2005 | Seo |
| 2005/0248849 A1 | 11/2005 | Urey |
| 2006/0028400 A1 | 2/2006 | Lapstun |
| 2006/0119951 A1 | 6/2006 | McGuire |
| 2007/0109505 A1 | 5/2007 | Kubara |
| 2007/0246641 A1 | 10/2007 | Baun |
| 2008/0036853 A1 | 2/2008 | Shestak |
| 2008/0094720 A1 | 4/2008 | Yamazaki |
| 2008/0291531 A1 | 11/2008 | Heimer |
| 2009/0115842 A1 | 5/2009 | Saito |
| 2009/0168010 A1 | 7/2009 | Vinogradov |
| 2009/0256943 A1 * | 10/2009 | Kondo ............ H04N 3/15 348/311 |
| 2010/0091027 A1 | 4/2010 | Oyama |
| 2010/0109977 A1 | 5/2010 | Yamazaki |
| 2010/0208372 A1 | 8/2010 | Heimer |
| 2010/0271698 A1 | 10/2010 | Kessler |
| 2010/0289970 A1 | 11/2010 | Watanabe |
| 2011/0037951 A1 | 2/2011 | Hua |
| 2011/0043644 A1 | 2/2011 | Munger |
| 2011/0075257 A1 | 3/2011 | Hua |
| 2011/0090389 A1 | 4/2011 | Saito |
| 2011/0221656 A1 | 9/2011 | Haddick |
| 2012/0013988 A1 | 1/2012 | Hutchin |
| 2012/0019557 A1 | 1/2012 | Aronsson |
| 2012/0050891 A1 | 3/2012 | Seidl |
| 2012/0057129 A1 | 3/2012 | Durnell |
| 2012/0081800 A1 | 4/2012 | Cheng |
| 2012/0113092 A1 | 5/2012 | Bar-Zeev |
| 2012/0160302 A1 | 6/2012 | Citron |
| 2012/0162549 A1 | 6/2012 | Gao |
| 2012/0242697 A1 | 9/2012 | Border |
| 2013/0100524 A1 | 4/2013 | Magarill |
| 2013/0112705 A1 | 5/2013 | McGill |
| 2013/0187836 A1 | 7/2013 | Cheng |
| 2013/0222896 A1 | 8/2013 | Komatsu |
| 2013/0258461 A1 | 10/2013 | Sato |
| 2013/0285885 A1 | 10/2013 | Nowatzyk |
| 2013/0286053 A1 | 10/2013 | Fleck |
| 2013/0300634 A1 | 11/2013 | White |
| 2013/0329304 A1 | 12/2013 | Hua |
| 2014/0009845 A1 | 1/2014 | Cheng |
| 2014/0300869 A1 | 10/2014 | Hirsch |
| 2014/0361957 A1 | 12/2014 | Hua |
| 2015/0168802 A1 | 6/2015 | Bohn |
| 2015/0201176 A1 | 7/2015 | Graziosi |
| 2015/0208061 A1 | 7/2015 | Yang |
| 2015/0212321 A1 | 7/2015 | Zhao |
| 2015/0277129 A1 | 10/2015 | Hua |
| 2015/0363978 A1 | 12/2015 | Maimone |
| 2016/0085075 A1 | 3/2016 | Cheng |
| 2016/0239985 A1 | 8/2016 | Haddick et al. |
| 2016/0320620 A1 | 11/2016 | Maimone |
| 2017/0078652 A1 | 3/2017 | Hua |
| 2017/0102545 A1 | 4/2017 | Hua |
| 2017/0202633 A1 | 7/2017 | Liu |
| 2018/0045949 A1 | 2/2018 | Hua |

FOREIGN PATENT DOCUMENTS

| | | | |
|---|---|---|---|
| CN | 101424788 A | 5/2009 | |
| EP | 0408344 | 1/1991 | |
| EP | 1102105 | 5/2001 | |
| FR | 2928034 A1 * | 8/2009 | ............ H01J 31/26 |
| JP | 2-200074 | * 8/1990 | |
| JP | H09218375 A | 8/1997 | |
| JP | H09297282 | 11/1997 | |
| JP | H1013861 | 1/1998 | |
| JP | H10307263 | 11/1998 | |
| JP | H11326820 A | 11/1999 | |
| JP | 2001013446 | 1/2001 | |
| JP | 2001066543 A | 3/2001 | |
| JP | 2001145127 | 5/2001 | |
| JP | 2001238229 | 8/2001 | |
| JP | 2002148559 | 5/2002 | |
| JP | 2003241100 | 8/2003 | |
| JP | 2006276884 A | 10/2006 | |
| JP | 2007101930 | 4/2007 | |
| JP | 2014505381 | 2/2014 | |
| WO | 9923647 | 5/1999 | |
| WO | 2004079431 A1 | 9/2004 | |
| WO | 2007002694 A2 | 1/2007 | |
| WO | 2007085682 | 8/2007 | |
| WO | 2007002694 A3 | 12/2007 | |
| WO | 2007140273 A2 | 12/2007 | |
| WO | 2008089417 A2 | 7/2008 | |
| WO | 2011134169 | 11/2011 | |
| WO | 2012064546 | 5/2012 | |
| WO | 2012118573 | 9/2012 | |
| WO | 2013112705 | 8/2013 | |

(56) References Cited

FOREIGN PATENT DOCUMENTS

| | | |
|---|---|---|
| WO | 2014062912 | 4/2014 |
| WO | 2015134738 | 9/2015 |
| WO | 2015134740 | 9/2015 |
| WO | 2016033317 | 3/2016 |
| WO | 2018052590 | 3/2018 |

OTHER PUBLICATIONS

US 9,213,186 B2, 12/2015, Cheng (withdrawn)
US 9,880,387 B2, 01/2018, Hua (withdrawn)
'Fresnel Lenses' downloaded from http://www.fresneltech.com on Jun. 8, 2011. Copyright Fresnel Technologies, Inc., 2003.
Azuma, R., et al., 'Recent advances in augmented reality', IEEE Computer Graphics App;. 21, 34-47 (2001).
Bajura, M., et al., "Merging virtual objects with the real world: seeing ultrasound imagery within the patient" in Proceedings of ACM SIGGRAPH (ACM, Chicago, 1992), pp. 203-210.
Biocca, et al., "Virtual eyes can rearrange your body: adapting to visual displacement in see-through, head-mounted displays", Presence: Teleoperators and Virtual Environments 7, 262-277 (1998).
Bunkenburg, J. 'Innovative Diffractive Eyepiece for Helmet-Mounted Display.' SPIE vol. 3430. pp. 41-49 Jul. 1998.
C. Curatu, H. Hua, and J. P. Rolland, "Projection-based headmounted display with eye-tracking capabilities," Proc. SPIE 5875, 587050J (2005).
Cakmakci, O., et al., 'Head-Worn Displays: A Review'. Journal of Display Technology, vol. 2, No. 3, Sep. 2006, pp. 199-216.
Caudell, T., et al., "Augmented reality: an application of heads-up display technology to manual manufacturing processes" in Proceedings of Hawaii International Conferences on Systems Sciences (Hawaii, 1992), pp. 659-669.
Cruz-Neira et al., 'Surround-Screen Projection-Based Virtual Reality: the Design and Implementation of the CAVE,' Proceedings of the 20th Annual Conference on Computer Graphics and Interactive Techniques pp. 135-142, ACM SIGGRAPH, ACM Press (1993).
Examination Report dated Apr. 29, 2011 from corresponding GB Application No. GB1012165.5.
H. Hua, C. Gao, and J. P. Rolland, 'Study of the Imaging properties of retroreflective materials used in head-mounted projective displays (HMPDs),' Proc. SPIE4711, 194-201 (2002).
H. Hua, C. Gao, F. Biocca, and J. P. Rolland, "An ultra-light and compact design and implementation of head-mounted projective displays," in Proceedings of IEEE VR 2001, pp. 175-182.
H. Hua, L. Brown, and C. Gao, "A new collaborative infrastructure: SCAPE," in Proceedings of IEEE VR 2003 (IEEE, 2003), pp. 171-179.
H. Hua, L. Brown, and C. Gao, "SCAPE: supporting stereoscopic collaboration in augmented and projective environments," IEEE Comput. Graphics Appl. 24, 66-75 (2004).
H. Hua, L. Brown, and C. Gao, "System and interface framework for SCAPE as a collaborative infrastructure," Presence: Teleoperators and Virtual Environments 13, 234-250 (2004).
H. Hua, Y. Ha, and J. P. Rolland, 'Design of an ultra-light and compact projection lens,' Appl. Opt. 42, 1-12 (2003), pp. 97-107.
H. Hua., A. Girardot, C. Gao. J. P. Rolland. 'Engineering of head-mounted projective displays'. Applied Optics. 39 (22), pp. 3814-3824. (2000).
H. Hua and C. Gao, "A polarized head-mounted projective display," in Proceedings of IEEE and ACM International Symposium on Mixed and Augmented Reality 2005 (IEEE, 2005), pp. 32-35.
Hua et al., 'Design of a Bright Polarized Head-Mounted Projection Display' Applied Optics 46:2600-2610 (2007).
International Search Report dated Mar. 9, 2009 with regard to International Patent Application No. PCT/US2009/031606.
J. L. Pezzaniti and R. A. Chipman, "Angular dependence of polarizing beam-splitter cubes," Appl. Opt. 33, 1916-1929 (1994).
J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).
J. P. Rolland and Hong Hua. "Head-mounted display systems," in Encyclopedia of Optical Engineering. R. Barry Johnson and Ronald O. Driggers, Eds, (2005).
Krueerke, Daniel, "Speed May Give Ferroelectric LCOS Edge in Projection Race," Display Devices Fall '05. Copyright 2005 Dempa Publications, Inc. pp. 29-31.
L. Brown and H. Hua, "Magic lenses for augmented virtual environments," IEEE Comput. Graphics Appl. 26, 64-73 (2006).
L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.
M. Inami, N. Kawakami, and S. Tachi, 'Optical camouflage using retro-reflective projection technology,' in Proceedings of ISMAR 2003 {ISMAR, 2003).
M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.
M. Robinson. J. Chen, and G. Sharp, Polarization Engineering for LCD Projection. John Wiley & Sons, Ltd. England, 2005.
N. Kawakami, M. Inami, D. Sekiguchi, Y. Yangagida, T. Maeda, and S. Tachi, 'Object-oriented displays: a new type of display systemsfrom immersive display to object-oriented displays,' in Proceedings of IEEE SMC 1999, IEEE International Conference on Systems, Man, and Cybernetics, vol. 5, pp. 1066-1069.
R. Azuma, A Survey of Augmented Reality in Presence; Teleoperators and Virtual Environments 6. 4, 355-385, (1997).
R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.
R. Kijima and T. Ojika, "Transition between virtual environment and workstation environment with projective headmounted display," in Proceedings of IEEE VR 1997 (IEEE, 1997), pp. 130-137.
R. Martins, V. Shaoulov, Y. Ha, and J. P. Rolland, "Projection based head-mounted displays for wearable computers," Proc. SPIE 5442, 104-110 (2004).
R. N. Berry, L. A. Riggs, and C. P. Duncan, "The relation of vernier and depth discriminations to field brightness," J. Exp. Psychol. 40, 349-354 (1950).
Rolland, J.P., et al., 'Optical versus video see-through head mounted displays in medical visualization', Presence' Teleoperators and Virtual Environments 9, 287-309 (2000).
Winterbottom, M., et al., 'Helmet-Mounted Displays for use in Air Force Training and Simulation', Human Effectiveness Directorate, Nov. 2005, pp. 1-54.
Written Opinion of the International Searching Authority dated Mar. 9, 2009 with regard to International Patent Application No. PCT/US2009/031606.
Y. Ha, H. Hua, R. Martins, and J. P. Rolland, "Design of a wearable wide-angle projection color display," in Proceedings of International Optical Design Conference 2002 (IODC, 2002), pp. 67-73.
Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.
Zhang, R., et al., "Design of a Polarized Head-Mounted Projection Display Using Ferroelectric Liquid-Crystal-on-Silicon Microdisplays", Applied Optics, vol. 47, No. 15, May 20, 2008, pp. 2888-2896.
Zhang, R., et al., "Design of a Polarized Head-Mounted Projection Display using FLCOS Microdisplays", Proc. of SPIE vol. 6489, 64890B-1. (2007)
"OLED-XL Microdisplays," eMagin 5 pages (2010).
A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.
A. Malmone, and H. Fuchs, "Computational augmented reality eyeglasses," Proc. of ISMAR 2012.
A. Castro, Y. Frauel, and B. Javidi, "Integral imaging with large depth of field using an asymmetric phase mask," Journal of Optics Express, vol. 15, Issue 16, pp. 10266-10273 (Aug. 2007).

(56) References Cited

OTHER PUBLICATIONS

A. T. Duchowski, "Incorporating the viewer's Point-Of-Regard (POR) in gaze-contingent virtual environments", SPIE-Int. Soc. Opt. Eng. Proceedings of Spie—the International Society for Optical Engineering, vol. 3295, 1998, pp. 332-343.

Akeley et al., "A Stereo Display Prototype with Multiple Focal Distances," ACM Trans. Graphics 23:804-813 (2004).

Blundell, B. G., and Schwarz, A. J., "The classification of volumetric display systems: characteristics and predictability of the image space," IEEE Transaction on Visualization and Computer Graphics, 8(1), pp. 66-75, 2002.

C. B. Burckhardt, "Optimum parameters and resolution limitation of integral photography," J. Opt. Soc. Am. 58, 71-76 (1968).

C. Manh Do, R. Mart□ ñez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).

Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.

Christopher M. Bishop, Neural Networks for Pattern Recognition, Oxford University Press, Inc. New York, NY 1995.

Curatu, C., J.P. Rolland, and Hong Hua, "Dual purpose lens for an eye-tracked projection head-mounted display," Proceedings of International Optical Design Conference, Vancouver, Canada, Jun. 2006.

D. Cheng, Y.Wang, H. Hua, and M. M. Talha, Design of an optical see-through headmounted display with a low f-number and large field of view using a free-form prism, App. Opt. 48 (14), pp. 2655-2668, 2009.

D. Cheng, Y. Wang, H. Hua, and M. M. Talha, "Design of an optical see-through head-mounted display with a low f-number and large field of view using a freeform prism," Appl. Opt., 48(14):2655-2668, 2009.

D. Cheng, Y. Wang, H. Hua, J. Sasian, "Design of a wide-angle, lightweight head-mounted display using free-form optics tiling," Opt. Lett., 36(11):2098-100, 2011.

D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).

Davis et al., "Accommodation to Large Disparity Stereograms," Journal of AAPOS 6:377-384 (2002).

Downing et al., "A Three-Color, Solid-State, Three-Dimensional Display," Science 273:1185-1189 (1996).

Duchowski, A., "Eyetracking Methodology: theory and practice," Publisher: Springer, 2003.

Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).

Edgar et al., "Visual Accommodation Problems with Head-Up and Helmet-Mounted Displays?," Displays 15:68-75 (1994).

European Search Report dated Aug. 14, 2015 in corresponding EP application 13740989.2.

F. Okano, H. Hoshino, J. Arai y I. Yuyama, "Real-time pickup method for a three-dimensional image based on integral photography," Appl. Opt. 36, 1598-1603 (1997).

Favalora et al., "100 Million-Voxel Volumetric Display," Proc. SPIE 4712:300-312 (2002).

G. Wetzstein et al., "Tensor Displays: Compressive light field synthesis using multilayer displays with directional backlighting," ACM Transactions on Graphics, 31(4), 2012.

GB Examination Report corresponding to GB 1012165.5 dated Jun. 28, 2011.

Geisler, W.S., J.S. Perry and J. Najemnik, "Visual search: The role of peripheral information measured using gaze-contingent displays," J. Vision 6, 858-873 (2006).

Graham-Rowe, "Liquid Lenses Make a Splash," Nature-Photonics pp. 2-4 (2006).

H. Hua, X. Hu, and C. Gao, "A high-resolution optical see-through head-mounted display with eyetracking capability," Optics Express, Nov. 2013.

H. Hua, "Sunglass-like displays become a reality with freeform optical technology," SPIE Newsroom, 2012.

H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.

H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).

H. Hua, C. Pansing, and J.P. Rolland, "Modeling of an eye-imaging system for optimizing illumination schemes in an eye-tracked head-mounted display," Appl. Opt., 46(31):7757-75, Oct. 2007.

H. Hua, P. Krishnaswamy, and J.P. Rolland, 'Video-based eyetracking methods and algorithms in head-mounted displays,' Opt. Express, 14(10):4328-50, May 2006.

Heanue et al., "Volume Holographic Storage and Retrieval of Digital Data," Science 265:749-752 (1994).

Hidenori Kuriyabashi, Munekazu Date, Shiro Suyama, Toyohiko HatadaJ. of the SID 14/5, 2006 pp. 493-498.

Hua, "Merging the Worlds of Atoms and Bits: Augmented Virtual Environments," Optics and Photonics News 17:26-33 (2006).

Hua, H., C. Pansing, and J. P. Rolland, "Modeling of an eye-imaging system for optimizing illumination schemes in an eye-tracked head-mounted display," Applied Optics, 46(32): 1-14, Nov. 2007.

Hua, H. "Integration of eye tracking capability into optical see-through head-mounted displays," Proceedings of SPIE (Electronic Imaging 2001), pp. 496-503, Jan. 2001.

Hua et al, "Compact eyetracked optical see-through head-mounted display", Proc. SPIE 8288, Stereoscopic Displays and Applications XXIII, 82881F (Feb. 9, 2012).

Inoue et al., "Accommodative Responses to Stereoscopic Three-Dimensional Display," Applied Optics, 36:4509-4515 (1997).

International Search Report and Written Opinion dated Nov. 24, 2015 in corresponding PCT application PCT/US2015/047163.

International Search Report dated Feb. 10, 2011 from PCT/CN2010/072376.

International Search Report dated Jan. 29, 2014 in corresponding international application PCT/US2013/065422.

International Search Report dated Jun. 18, 2010 in corresponding international application PCT/US2010/031799.

J. Hong, S. Min, and B. Lee, "Integral floating display systems for augmented reality," Applixed Optics, 51(18):4201-9, 2012.

J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).

J. Arai, et al., "Depth-control method for integral imaging," Feb. 1, 2008 / vol. 33, No. 3 / Optics Letters.

J. E. Melzer's: 'Overcoming the field-of-view/resolution invariant in head-mounted displays' PROC. SPIE vol. 3362, 1998, p. 284.

J. G. Droessler, D. J. Rotier, "Tilted cat helmet-mounted display," Opt. Eng., vol. 29, 849 (1990).

J. P. Rolland, "Wide-angle, off-axis, see-through head-mounted display," Opt. Eng., vol. 39, 1760 (2000).

J. S. Jang, F. Jin, and B. Javidi, "Three-dimensional integral imaging with large depth of focus by use of real and virtual image fields," Opt. Lett. 28:1421-23, 2003.

J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.

Jisoo Hong, et al., "Three-dimensional display technologies of recent interest: Principles, Status, and Issues," Applied Optics (Dec. 1, 2011) 50(34):106.

K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.

(56) References Cited

OTHER PUBLICATIONS

K. Iwamoto, S. Katsumata, K. Tanie, "An eye movement tracking type head mounted display for virtual reality system:—evaluation experiments of a prototype system", Proceedings of 1994 IEEE International Conference on Systems, Man, and Cybernetics. Humans, Information and Technology (Cat. No.94CH3571-5). IEEE. Part vol. 1, 1994, pp. 13-18 vol. 1. New York, NY, USA.

Kuiper et al., "Variable-Focus Liquid Lens for Miniature Cameras," Applied Physics Letters 85:1128-1130 (2004).

Kuribayashi, et al., "A Method for Reproducing Apparent Continuous Depth in a Stereoscopic Display Using"Depth-Fused 3D" Technology" Journal of the Society for Information Display 14:493-498 (2006).

L. G. Brown's: 'Applications of the Sensics panoramic HMD' SID Symposium Digest vol. 39, 2008, p. 77.

Laurence R. Young, David Sheena, "Survey of eye movement recording methods", Behavior Research Methods & Instrumentation, 7(5), 397-429, 1975.

Liu et al., 'A Novel Prototype for an Optical See-Through Head-Mounted Display with Addressable Focus Cues,' IEEE Transactions on Visualization and Computer Graphics 16:381-393 (2010).

Liu et al., "A Systematic Method for Designing Depth-Fused Multi-Focal Plane Three-Dimensional Displays," Optics Express 18:11562-11573 (2010).

Liu et al., "An Optical See-Through head Mounted Display with Addressable Focal Planes," IEEE Computer Society, pp. 33-42 (2008).

Liu et al., "Time-Multiplexed Dual-Focal Plane Head-Mounted Display with a Liquid Lens," Optics Letters 34:1642-1644 (2009).

Loschky, L.C. and Wolverton, G.S., "How late can you update gaze-contingent multiresolutional displays without detection?" ACM Trans. Mult. Comp. Comm. and App. Nov. 3, 2007.

Love et al. (High Speed switchable lens enables the development of a volumetric stereoscopic display. Aug 2009, Optics Express. vol. 17, No. 18, pp. 15716-15725.).

M. Marti-nez-Corral, H. Navarro, R. Mart☐ ñ ez-Cuenca, G. Saavedra, and B. Javidi, "Full parallax 3-D TV with programmable display parameters," Opt. Phot. News 22, 50-50 (2011).

M. D. Missig and G. M. Morris, "Diffractive optics applied to eyepiece design," Appl. Opt. 34, 2452-2461 (1995).

M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.

M. Gutin: 'Automated design and fabrication of ocular optics' PROC. SPIE 2008, p. 7060.

M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.

M. Lucente, "Interactive three-dimensional holographic displays: seeing the future in depth," Computer Graphics, 31(2), pp. 63-67, 1997.

McQuaide et al., "A Retinal Scanning Display System That Produces Multiple Focal Planes with a Deformable Membrane Mirror," Displays 24:65-72 (2003).

Mon-Williams et al., "Binocular Vision in a Virtual World: Visual Deficits Following the Wearing of a Head-Mounted Display," Ophthalmic Physiol. Opt. 13:387-391 (1993).

O. Cakmakci, B. Moore, H. Foroosh, and J. P. Rolland, "Optimal local shape description for rotationally non-symmetric optical surface design and analysis," Opt. Express 16, 1583-1589 (2008).

Optical Research Associates, http://www.optica1res.com, 2 pages (obtained Jan. 26, 2011).

P. A. Blanche, et al, "Holographic three-dimensional telepresence using large-area photorefractive polymer", Nature, 468, 80-83, Nov. 2010.

P. Gabbur, H. Hua, and K. Barnard, 'A fast connected components labeling algorithm for real-time pupil detection,' Mach. Vision Appl., 21(5):779-787, 2010.

R. MartÃ?Â-nez-Cuenca, H. Navarro, G. Saavedra, B. Javidi, and M. MartÃ?Â-nez-Corral, "Enhanced viewing-angle integral imaging by multiple-axis telecentric relay system," Optics Express, vol. 15, Issue 24, pp. 16255-16260, Nov. 21, 2007.

R. Schulein, C. Do, and B. Javidi, "Distortion-tolerant 3D recognition of underwater objects using neural networks," Journal of Optical Society of America A, vol. 27, No. 3, pp. 461-468, Mar. 2010.

R. Schulein, M. DaneshPanah, and B. Javidi, "3D imaging with axially distributed sensing," Journal of Optics Letters, vol. 34, Issue 13, pp. 2012-2014, Jul. 1, 2009.

R.J. Jacob, "The use of eye movements in human-computer interaction techniques: what you look at is what you get", ACM Transactions on Information Systems, 9(2), 152-69, 1991.

Reingold, E.M., L.C. Loschky, G.W. McConkie and D.M. Stampe, "Gaze-contingent multiresolutional displays: An integrative review," Hum. Factors 45, 307-328 (2003).

Rolland, J. P., A. Yoshida, L. D. Davis and J. H. Reif, "High-resolution inset head-mounted display," Appl. Opt. 37, 4183-93 (1998).

Rolland et al., "Multifocal Planes Head-Mounted Displays," Applied Optics 39:3209-3215 (2000).

S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.

S. Hong, J. Jang, and B. Javidi,"Three-dimensional volumetric object reconstruction using computational integral imaging," Journal of Optics Express, on-line Journal of the Optical Society of America, vol. 12, No. 3, pp. 483-491, Feb. 9, 2004.

S. Hong and B. Javidi, "Distortion-tolerant 3D recognition of occluded objects using computational integral imaging," Journal of Optics Express, vol. 14, Issue 25, pp. 12085-12095, Dec. 11, 2006.

S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.

Schowengerdt, B. T., and Seibel, E. J., "True 3-D scanned voxel displays using single or multiple light sources," Journal of SID, 14(2), pp. 135-143, 2006.

Schowengerdt et al., "True 3-D Scanned Voxel Displays Using Single or Multiple Light Sources," J. Soc. Info. Display 14:135-143 (2006).

Sheedy et al., "Performance and Comfort on Near-Eye Computer Displays," Optometry and Vision Science 79:306-312 (2002).

Shibata et al., "Stereoscopic 3-D Display with Optical Correction for the Reduction of the Discrepancy Between Accommodation and Convergence," Journal of the Society for Information Display 13:665-671 (2005).

Shiwa et al., "Proposal for a 3-D Display with Accommodative Compensation: 3DDAC," Journal of the Society for Information Display 4:255-261 (1996).

Sullivan, "A Solid-State Multi-Planar Volumetric Display," SID Symposium Digest of Technical Papers 34:354-356 (2003).

Suyama, S., Ohtsuka, S., Takada, H., Uehira, K., and Sakai, S., "Apparent 3D image perceived from luminance-modulated two 2D images displayed at different depths," Vision Research, 44: 785-793, 2004.

T. Okoshi, "Optimum design and depth resolution of lens-sheet and projection-type three-dimensional displays," Appl. Opt. 10, 2284-2291 (1971).

T. Ando, K. Yamasaki, M. Okamoto, and E. Shimizu, "Head Mounted Display using holographic optical element," Proc. SPIE, vol. 3293, 183 (1998).

Tibor Balogh, "The HoloVizio System," Proceedings of SPIE, VOI 6055, 2006.

Varioptic, "Video Auto Focus and Optical Image Stabilization," http://vvww.varioptic.com/en/home.html, 2 pages (2008).

Wann et al., Natural Problems for Stereoscopic Depth Perception in Virtual Environments, Vision Res. 35:2731-2736 (1995).

Wartenberg, Philipp, "EyeCatcher, the Bi-directional OLED Microdisplay," Proc. of SID 2011.

Watt et al., "Focus Cues Affect Perceived Depth," J Vision 5:834-862 (2005).

(56) References Cited

OTHER PUBLICATIONS

Written Opinion dated Feb. 10, 2011 from PCT/CN2010/072376.
Written Opinion dated Jun. 18, 2010 in corresponding international application PCT/US2010/031799.
X. Hu and H. Hua, "Design and assessment of a depth-fused multi-focal-plane display prototype," Journal of Display Technology, Dec. 2013.
Xiao Xiao, Bahram Javidi, Manuel Martinez-Corral, and Adrian Stern, "Advances in Three-Dimensional Integral Imaging: Sensing, Display, and Applications," Applied Optics, 52(4):. 546-560,2013.
Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).
Xinda Hu and Hong Hua, "High-resolution optical see-through multi-focal-plane head-mounted display using freeform optics," Optics Express,22(11): 13896-13903, Jun. 2014.
Y. Takaki, Y. Urano, S. Kashiwada, H. Ando, and K. Nakamura, "Super multi-view winshield display for long-distance image information presentation," Opt. Express, 19, 704-16, 2011.
Yamazaki et al, "Thin wide-field-of-view HMD with free-form-surface prism and applications", Proc. SPIE 3639, Stereoscopic Displays and Virtual Reality Systems VI, 453 (May 24, 1999).
Yano, S., Emoto, M., Mitsuhashi, T., and Thwaites, H., "A study of visual fatigue and visual comfort for 3D HDTV/HDTV images," Displays, 23(4), pp. 191-201, 2002.
S. Feiner, 2002, "Augmented reality: A new way of seeing," Scientific American, No. 54, 2002.
K. Ukai and P.A. Howardth, "Visual fatigue caused by viewing stereoscopic motion images: background, theories, and observations," Displays, 29(2), pp. 106-116, 2008.
B. T. Schowengerdt, M. Murari, E. J. Seibel, "Volumetric display using scanned fiber array," SID Symposium Digest of Technical Papers, 2010.
H. Hua and B. Javidi, "A 3D integral imaging optical see-through head-mounted display", Optics Express, 22(11): 13484-13491, 2014.
W. Song, Y. Wang. D. Cheng, Y. Liu, "Light field head-mounted display with correct focus cue using micro structure array," Chinese Optics Letters, 12(6): 060010, 2014.
T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.
Hu, X., Development of the Depth-Fused Multi-Focal Plane Display Technology, Ph.D. Dissertation, College of Optical Sciences, University of Arizona, 2014.
S. Ravikumar, K. Akeley, and M. S. Banks, "Creating effective focus cues in multi-plane 3D displays," Opt. Express 19, 20940-20952, 2011.
X. Hu and H. Hua, "Design and tolerance of a free-form optical system for an optical see-through multi-focal-plane display," Applied Optics, 54(33): 9990-9, 2015.
A. Yabe, "Representation of freeform surface suitable for optimization," Applied Optics, 2012.
Armitage, David, Ian Underwood, and Shin-Tson Wu. Introduction to Microdisplays. Chichester, England: Wiley, 2006.
European Search Report dated Apr. 28, 2016 from EP application 13847218.8.
Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).
Hu and Hua, "Design and tolerance of a freeform optical system for an optical see-through multifocal plane display," Applied Optics, 2015.
Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.
Dewen Cheng et al.; "Large field-of-view and high resolution free-form head-mounted display"; SPIE-OSA/ vol. 7652 Jun. 2018.
G. Lippmann, "Epreuves reversibles donnant la sensation du relief," Journal of Physics (Paris) 7, 821-825 (1908).
Huang et al., "An integral-imaging-based head-mounted light field display using a tunable lens ,;1nd aperture array." Journal of the Society for Information Display Mar. 1, 2017; p. 199-201.
Xin et al., "Design of Secondary Optics for IRED in active night vision systems," Jan. 10, 2013, vol. 21, No. 1, Optics Express, pp. 1113-1120.
S. Nikzad, Q. Yu, A. L. Smith, T. J. Jones, T. A. Tombrello, S. T. Elliott, "Direct detection and imaging of low-energy electrons with delta-doped charge-coupled devices," Applied Physics Letters, vol. 73, p. 3417, 1998.

\* cited by examiner

SMALL PORTABLE NIGHT VISION SYSTEM

RELATED APPLICATIONS

This application is a divisional application of U.S. application Ser. No. 15/017,763, filed on Feb. 8, 2016, which claims the benefit of priority of U.S. Provisional Application No. 62/113,656, filed on Feb. 9, 2015, the entire contents of which application(s) are incorporated herein by reference.

FIELD OF THE INVENTION

The present invention relates generally to night vision systems, and more particularly, but not exclusively, to night vision systems that are compact in size due to the design of one or more of the optical system and the light detector module.

BACKGROUND OF THE INVENTION

Existing night vision systems, which include optics, a detector, a display, and power supply, are bulky, because state-of-the-art devices are optimized for resolution and sensitivity, but not size and weight. Three types of night vision technologies are currently deployed. A first one makes use of an image intensifier, which amplifies light 30,000 to 1,000,000 times, usually at the wavelength range of 0.4 to 1 micron. Since moonlight or starlight is usually present at night, a scene can be made visible provided there is enough amplification with high signal-to-noise ratio. The image intensifier includes a photocathode, a single or multiple microchannel plate, and a phosphor screen that emits green light, to which the human eye is most sensitive. Light is absorbed by the photocathode and converted to electrons, which are amplified by the microchannel plate. The electrons are then accelerated to the phosphor screen at high voltage (~600-900V), resulting in the generation of more light. In a typical night vision system, the image intensifier is sandwiched between the imaging optics and eyepiece, resulting in a bulky tubular structure. The image intensifier can also be coupled directly to a CCD detector by using intermediate optics or a fiber bundle.

A second night vision technology is application of active illumination in near infrared wavelengths (~0.7 to 1 micron) and detection using a conventional silicon based focal plane array such as a CCD or CMOS. The technique is used extensively indoors. For outdoor applications, the range of view is limited by the intensity and directionality of the illumination source. A third technology is thermal imaging. Objects at ambient temperature emit long wavelength infrared radiation at 7.5 to 15 microns. The radiation can be detected using InSb, InGaAs, HgCdTe, a quantum well infrared photodetector (QWIP), or microbolometer focal plane arrays. In many applications, the thermal image is combined with a visible image acquired using conventional silicon focal plane array to provide a thermal map of an object or scene.

SUMMARY OF THE INVENTION

In one of its aspects the present invention provides low weight and size, portable night vision systems with direct line of sight, utilizing freeform optics and compact integration of detectors and displays. For example, one particularly useful optical design of the present invention incorporates wedge-shaped lenses having freeform surfaces in both the collection optics and display optics. In this regard, exemplary designs of the present invention may include a wedge-shaped, freeform objective as the collection optics and a wedge-shaped, freeform eyepiece as the display optics. The collection optics of the present invention may capture an image of a scene for amplification by an image intensifier. The image intensifier may electrically communicate through appropriate electronics, such as a computer, with the microdisplay for displaying the intensified image. As used herein, the term "electrically communicate" is defined to include both wired and wireless communication and combinations thereof. The appropriate electronics, such as a computer, may be a physically separate unit from the microdisplay and image intensifier, or may be incorporated as part of one or more of the image intensifier and microdisplay. The display optics of the present invention may be configured to form an image of the microdisplay at an eye pupil for viewing by a user.

For instance, in one exemplary configuration the present invention may provide a compact night vision system including an imaging device configured to receive light from a scene and a microdisplay disposed in electrical communication with the imaging device for generating an image to be viewed by a user. The image may be relayed to the user by a wedge-shaped, freeform eyepiece which has a first freeform surface positioned to receive light from the microdisplay, a second freeform surface configured to receive the light transmitted into the body of the eyepiece from the first freeform surface and configured to reflect the received light at the second surface, and a third freeform surface configured to receive the light reflected by the second freeform surface and configured to transmit the light out of the eyepiece. The first, second, and third freeform surfaces of the eyepiece may be positioned to provide the wedge-shape to the eyepiece.

In one desirable exemplary configuration, the imaging device may be a camera, such as a thermal imaging camera. Alternatively, the imaging device may include a wedge-shaped, freeform objective and an image intensifier positioned to receive light transmitted out of the objective. The image intensifier may be disposed in electrical communication with the microdisplay. The freeform objective may include a first freeform surface configured to receive light from a scene, a second freeform surface configured to receive the light transmitted into the body of the objective from the first freeform surface of the objective and configured to reflect the received light at the second surface of the objective, and a third freeform surface configured to receive the light reflected by the second freeform surface of the objective and configured to transmit the light out of the objective for delivery to the image intensifier. The first, second and third freeform surfaces of the objective may be positioned to provide the wedge-shape to the objective.

In another of its aspects, the present invention may provide a light detector module, which may be particularly compact, and therefore well-suited to night vision systems. The detector module may include a photocathode, a microchannel plate (MCP), a lens array, and a detector array, FIGS. 4A-5B. The compact configuration may be provided by a lens array coated with phosphor materials. Light generated by phosphor material may be collected by the microlenses of the array and focused onto and detected by respective individual pixels of the focal plane array.

In one desirable configuration, the light detector module may include, from a first end to a second end: a photocathode layer, a microchannel plate, a lens array, and a detector array where each element of the detector array is disposed in registration with a respective lens of the lens array. The lens array may include a plurality of microlenses coated with a phosphor layer and may include a barrier structure disposed between two adjacent microlenses of the microlens array. In addition, the lens array may include an Einzel lens array and the detector may include a Faraday cup array, a delta-doped CCD, an electrometer array, or a focal plane array.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION OF THE INVENTION

Figure 1:
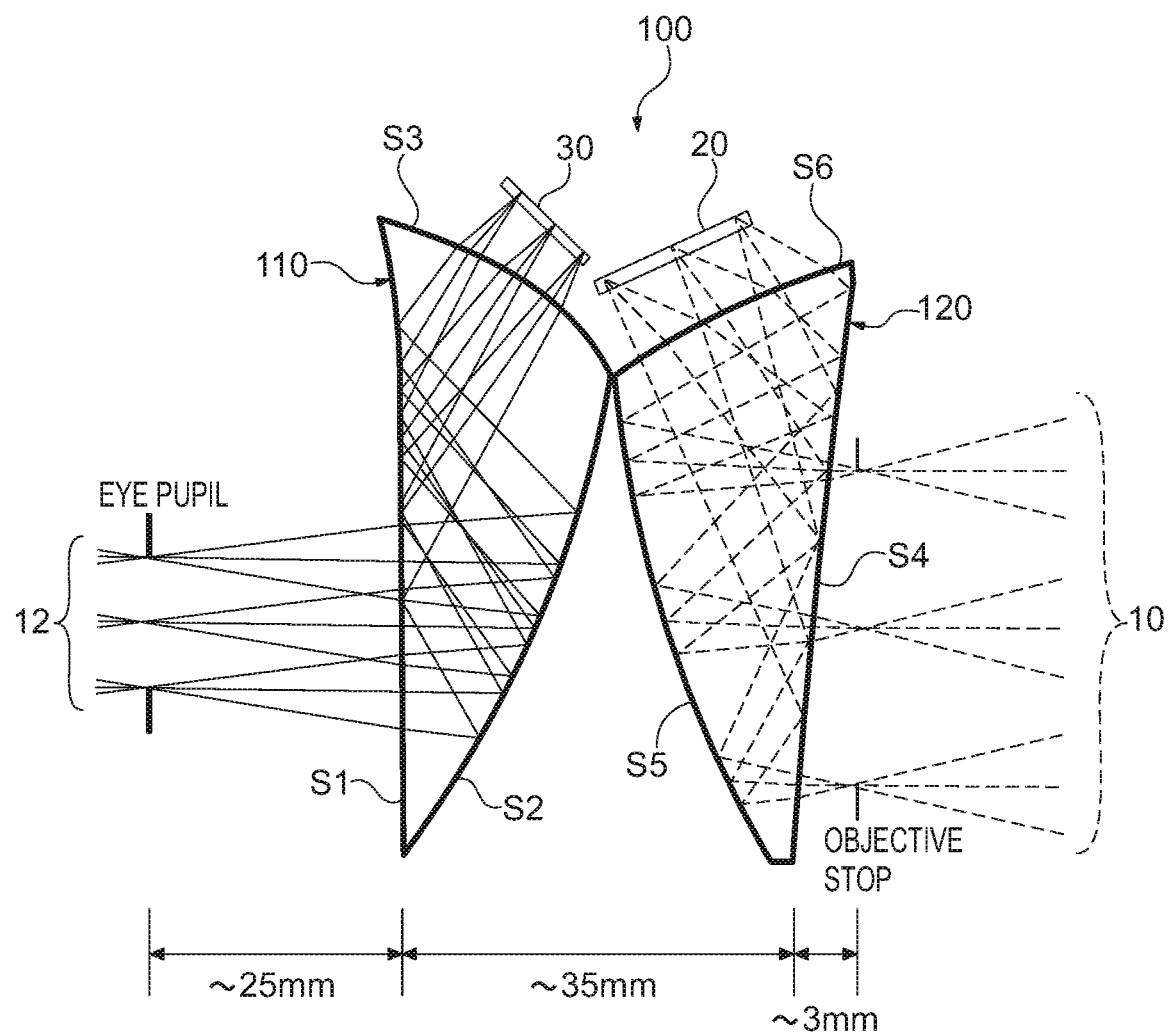
FIG. 1-3 schematically illustrate exemplary configurations of optical designs of compact imaging night vision systems in accordance with the present invention.

Referring now to the figures, wherein like elements are numbered alike throughout, the present invention may provide particularly compact and portable night vision systems, where the compact and portable features are due in part to one or more of the design of the optical system 100 and/or light detector module 400. For example, in one of its aspects the present invention may provide an optical system layout that is compact due to the inclusion of freeform optics, such as a wedge-shaped, freeform lens 110, 120 (e.g., a prism-lens), FIGS. 1-3, for example. The freeform optics may be the collection optics 120, the display optics 110, or both.

Figure 2:
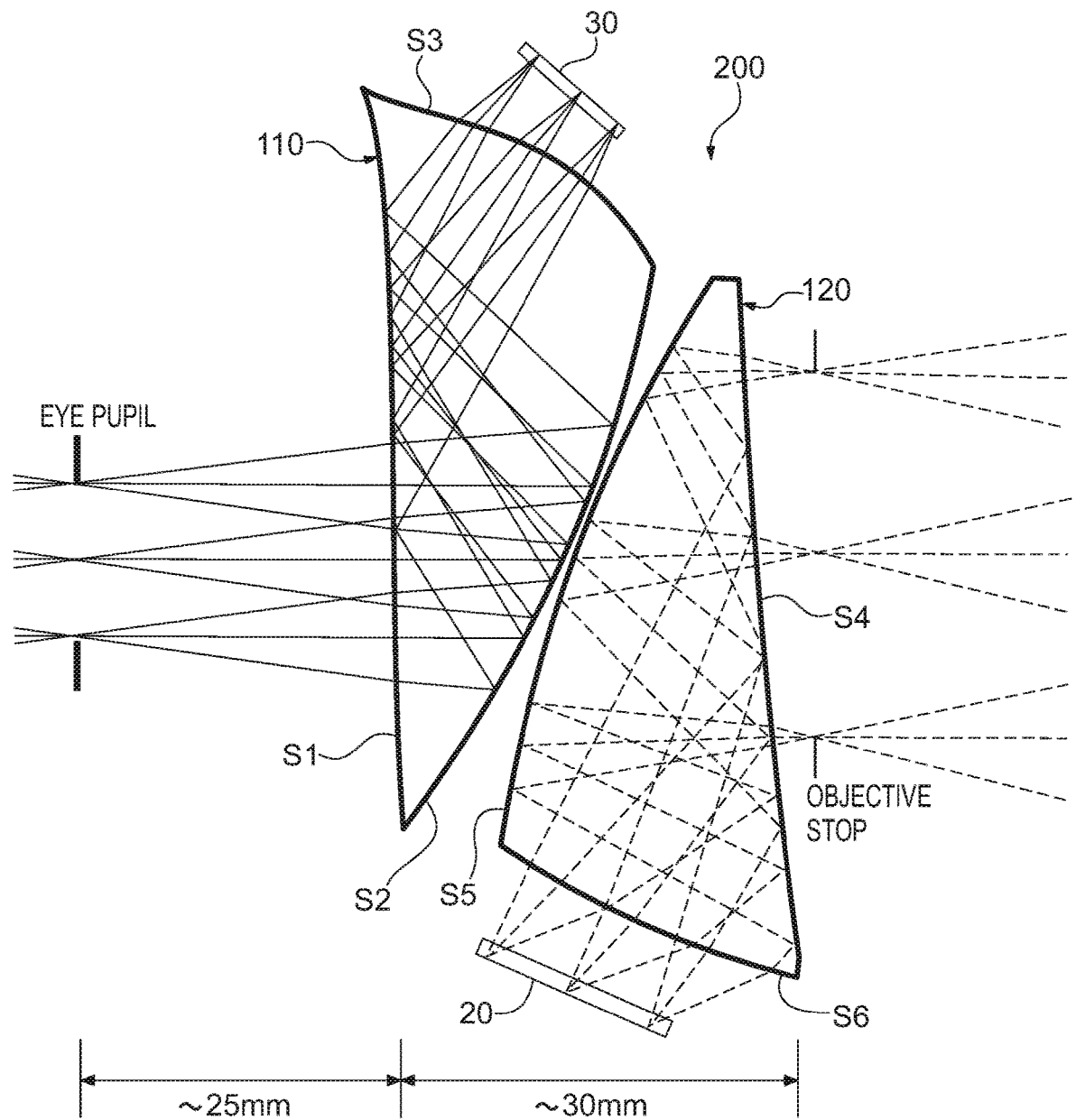

In exemplary configurations of the present invention as illustrated in FIGS. 1-2, a freeform objective 120 may be provided in the form of a wedge-shaped, freeform prism-lens. Likewise a freeform eyepiece 110 may be provided in the form of a wedge-shaped, freeform prism-lens. Each of the freeform objective 120 and freeform eyepiece 110 may define separate optical paths, such as a night vision capture path 10 and night vision image display path 12, respectively. The night vision capture path 10 may include the freeform objective 120, an objective stop, and an image intensifier 20, while the night vision image display path may include the freeform eyepiece 110 prism and a microdisplay 30. The image intensifier 20 may operate in the 0.4 to 1 micron range and may receive and intensify an image from the capture path 10, and then electronically communicate the intensified image to the microdisplay 30 for use in the night vision image display path 12. Both the freeform objective 120 and the freeform eyepiece 110 may be formed by multiple freeform optical surfaces S1-S3, S4-S6.

In the capture path 10, photons from a scene may pass through the objective stop and reach the detector (e.g., the image intensifier 20) through consecutive refraction and reflections by the prism-like objective 120. A principal advantage of the exemplary configurations of FIGS. 1-2 is the folding of the optical path inside a solid prism such as the freeform eyepiece 110 and/or freeform objective 120, which enables the detector 20 and/or microdisplay 30 to be packaged to the side. (In contrast, state-of-the art night vision goggles suffer from the large volume due to the co-linear restriction of conventional rotationally symmetric optics.) In the display path 12, the captured image may be processed in real time and displayed on the microdisplay 30. Light from the microdisplay 30 may thus propagate through the freeform eyepiece 110, via multiple consecutive refractions and reflections, and reach the eye pupil.

Turning to FIG. 1 in more detail, the exemplary freeform objective design shown therein has a field of view of 40 degrees and system F/number of 1.1, which achieves a fast objective 120 needed for night vision use. The display design shown in FIG. 1 offers an equivalent 40-degree field-of-view (FOV), a 25 mm eye clearance, and a 10 mm eye pupil. The overall volume of the optical system is approximately 35 mm thick, 40 mm high, and 25 mm wide, which is substantially more compact than the state-of-the-art night vision goggles. Example of a suitable commercially available image intensifiers include Image Intensifier DS001 (Photek Limited, East Sussex, UK) and iStar 334T (Andor Technology Ltd, Belfast, UK) that combines an image intensifier and CCD.

FIG. 2 schematically illustrates an additional configuration of a compact and portable night vision system 200 in accordance with the present invention which is similar in certain respects to the configuration of FIG. 1. In particular the freeform objective 120, freeform eyepiece 110, microdisplay 30, and image intensifier 20 may all be the same in both the configurations of FIGS. 1 and 2. However, in the configuration of FIG. 2, the freeform objective 120 is inverted relative to the freeform eyepiece 110 to permit the freeform objective 120 and freeform eyepiece 110 to be positioned more closely together. For example, whereas the freeform eyepiece 110 and freeform objective 120 in the configuration of FIG. 1 are separated by 35 mm, in the configuration of FIG. 2 the freeform eyepiece 110 and freeform objective 120 are separated by 30 mm.

Figure 3:
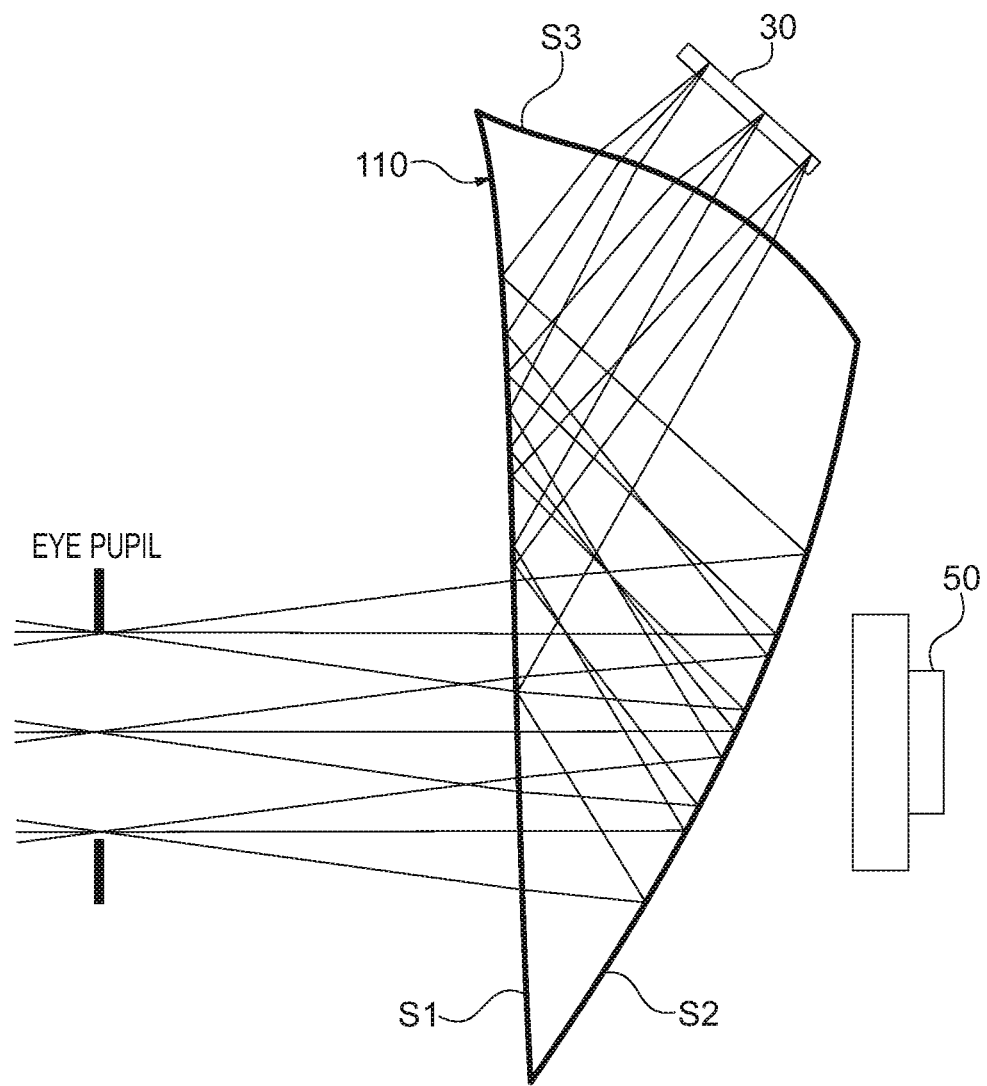

In yet another exemplary configuration in accordance with the present invention, as schematically illustrated in FIG. 3, an imaging device, such as a thermal camera module 50, operating in a 7.5 to 15 micron range may replace the freeform objective 120 using the configuration of FIGS. 1-2. The camera module 50 may collect information from a scene and electrically communicate it to the microdisplay 30. An example of a suitable commercially available thermal camera module is the Quark 2 Uncooled Thermal Imaging Camera Core (FLIR, Wilsonville, Oreg.) with 6.3 mm lens and dimensions of 22×22×35 mm. The position of the thermal camera module 50 may be set to provide real time imaging close to the direct line-of-sight of the eye. Reduction of parallax between measured image and image seen by the naked eye is important for night vision goggle application.

An optical prescription of the exemplary freeform eyepiece 110 of FIGS. 1-3 is listed in Tables 1-3 for surfaces S1, S2, and S3, respectively. Of the three optical surfaces in the freeform eyepiece 110, surface S1 is an anamorphic aspheric surface (AAS). The sag of an AAS surface is defined by $$z = \frac{c_x x^2 + c_y y^2}{1 + \sqrt{1 - (1 + K_x)c_x^2 x^2 - (1 + K_y)c_y^2 y^2}} +$$

$$AR\{(1-AP)x^2 + (1+AP)y^2\}^2 + BR\{(1-BP)x^2 + (1+BP)y^2\}^3 +$$
$$CR\{(1-CP)x^2 + (1+CP)y^2\}^4 + DR\{(1-DP)x^2 + (1+DP)y^2\}^5,$$

where z is the sag of the freeform surface measured along the z-axis of a local x, y, z coordinate system, $c_x$ and $c_y$ are the vertex curvature in x and y axes, respectively, $K_x$ and $K_y$ are the conic constant in x and y axes, respectively, AR, BR, CR and DR are the rotationally symmetric portion of the 4th, 6th, 8th, and 10th order deformation from the conic, AP, BP, CP, and DP are the non-rotationally symmetric components of the 4th, 6th, 8th, and 10th order deformation from the conic.

Surface S2 of the freeform eyepiece 110 may be an XY polynomial surface defined by:

$$z = \frac{c(x^2 + y^2)}{1 + \sqrt{1 - (1+k)c^2(x^2 + y^2)}} + \sum_{j=2}^{66} C_j x^m y^n,$$

$$j = [(m+n)^2 + m + 3n]/2 + 1$$

where z is the sag of the freeform surface measured along the z-axis of a local x, y, z coordinate system, c is the vertex curvature (CUY), k is the conic constant, and $C_j$ is the coefficient for $(m y^n)$.

Surface S3 may be an aspheric surface with a rotationally symmetric kinoform diffractive optical element, with the sag of the aspheric surface defined by:

$$z = \frac{cr^2}{1 + \sqrt{1 - (1+K)c^2 r^2}} + Ar^4 + Br^6 +$$
$$Cr^8 + Dr^{10} + Er^{12} + Fr^{14} + Gr^{16} + Hr^{18} + Jr^{20},$$

where z is the sag of the surface measured along the z-axis of a local x, y, z coordinate system, c is the vertex curvature, k is the conic constant, A through J are the 4th, 6th, 8th, 10th, 12th, 14th, 16th, 18th, and 20th order deformation coefficients, respectively.

TABLE 1

Optical surface prescription of surface S1 of the freeform eyepiece 110

| | |
|---|---|
| X Curvature ($c_x$) | −1.348215E−02 |
| Y Curvature ($c_y$) | 2.004523E−03 |
| Y Conic Constant ($K_Y$) | 0.998125E+01 |
| 4th Order Symmetric Coefficient (AR) | −3.9067945E−06 |
| 6th Order Symmetric Coefficient (BR) | −9.5768964E−17 |
| 8th Order Symmetric Coefficient (CR) | −2.8799927E−15 |
| 10th Order Symmetric Coefficient (DR) | −8.7077963E−16 |
| X Conic Constant ($K_X$) | −1.5687534E+01 |
| 4th Order Asymmetric Coefficient (AP) | −3.2949463E−01 |
| 6th Order Asymmetric Coefficient (BP) | −2.0405356E+02 |
| 8th Order Asymmetric Coefficient (CP) | −8.0782710E+00 |
| 10th Order Asymmetric Coefficient (DP) | −2.72019184E−01 |

TABLE 3

Optical surface prescription of surface S3 of the freeform eyepiece 110

| | |
|---|---|
| Y Radius | −1.5000000000E+01 |
| Conic Constant (K) | −8.1715030467E+00 |
| 4th Order Coefficient (A) | −3.5999478362E−05 |
| 6th Order Coefficient (B) | 4.1811989405E−07 |
| 8th Order Coefficient (C) | −2.0382499300E−09 |
| 10th Order Coefficient (D) | 3.7498678418E−12 |
| Diffraction Order | 1 |
| Construction Wavelength (nm) | 550 |
| R**2 (HCO C1) | −3.2332326174E−03 |
| R**4 (HCO C2) | 4.1482610496E−05 |
| R**6 (HCO C3) | −4.2185152895E−07 |
| R**8 (HCO C4) | 1.8253428127E−09 |
| R**10 (HCO C5) | −2.7615741244E−12 |

TABLE 2

Optical surface prescription of surface S2 of the freeform eyepiece 110

| | |
|---|---|
| Y Curvature | −1.26056882299E−02 |
| Y Radius | −7.93292664201E+01 |
| Conic Constant (SCO K \| C1) | 1.99429650209E+00 |
| X (SCO X \| C2) | 0.00000000000E+00 |
| Y (SCO Y \| C3) | 0.00000000000E+00 |
| X**2 (SCO X2 \| C4) | −2.8963611697E−03 |
| X * Y (SCO XY \| C5) | 0.00000000000E+00 |
| Y**2 (SCO Y2 \| C6) | 5.13151841830E−04 |
| X**3 (SCO Y3 \| C7) | 0.00000000000E+00 |
| X**2 * Y (SCO X2Y \| C8) | −1.6871196613E−05 |
| X Y**2 (SCO XY2 \| C9) | 0.00000000000E+00 |
| Y**3 (SCO Y3 \| C10) | −3.9628025988E−05 |
| X**4 (SCO X4 \| C11) | 5.63763951591E−07 |
| X**3 * Y (SCO X3Y \| C12) | 0.00000000000E+00 |
| X**2 * Y**2 (SCO X2Y2 \| C13) | −5.1451820404E−07 |
| X * Y**3 (SCO XY3 \| C14) | 0.00000000000E+00 |
| Y**4 (SCO Y4 \| C15) | 1.52902584933E−06 |
| X**5 (SCO X5 \| C16) | 0.00000000000E+00 |
| X**4 * Y (SCO X4Y \| C17) | 2.30036831137E−08 |
| X**3 * Y**2 (SCO X3Y2 \| C18) | 0.00000000000E+00 |
| X**2 * Y**3 (SCO X2Y3 \| C19) | 3.82949206634E−08 |
| X * Y**4 (SCO XY4 \| C20) | 0.00000000000E+00 |
| Y**5 (SCO Y5 \| C21) | −9.3057372440E−08 |
| X**6 (SCO X6 \| C22) | −2.3473886032E−09 |
| X**5 * Y (SCO X5Y \| C23) | 0.00000000000E+00 |
| X**4 * Y**2 (SCO X4Y2 \| C24) | −2.4682522624E−09 |
| X**3 * Y**3 (SCO X3Y3 \| C25) | 0.00000000000E+00 |
| X**2 * Y**4 (SCO X2Y4 \| C26) | −3.5764311583E−09 |
| X * Y**5 (SCO XY5 \| C27) | 0.00000000000E+00 |
| Y**6 (SCO Y6 \| C28) | −4.3636504848E−09 |
| X**7 (SCO X7 \| C29) | 0.00000000000E+00 |
| X**6 * Y (SCO X6Y \| C30) | −1.8300632292E−10 |
| X**5 * Y**2 (SCO X5Y2 \| C31) | 0.00000000000E+00 |
| X**4 * Y**3 (SCO X4Y3 \| C32) | −1.0237987168E−10 |
| X**3 * Y**4 (SCO X3Y4 \| C33) | 0.0000000000E+00 |
| X**2 * Y**5 (SCO S2Y5 \| C34) | 2.0693559836E−10 |
| X * Y**6 (SCO XY6 \| C35) | 0.0000000000E+00 |
| Y**7 (SCO Y7 \| C36) | 2.1203645386E−10 |
| X**8 (SCO X8 \| C37) | 2.6638311623E−12 |
| X**7 * Y (SCO X7Y \| C38) | 0.0000000000E+00 |
| X**6 * Y**2 (SCO X6Y2 \| C39) | 4.2552541871E−12 |
| X**5 * Y**3 (SCO X5Y3 \| C40) | 0.0000000000E+00 |
| X**4 * Y**4 (SCO X4Y4 \| C41) | −4.101261981E−12 |
| X**3 * Y**5 (SCO X3Y5 \| C42) | 0.0000000000E+00 |
| X**2 * Y**6 (SCO X2Y6 \| C43) | 3.9696325158E−12 |
| X * Y**7 (SCO XY7 \| C44) | 0.0000000000E+00 |
| Y**8 (SCO Y8 \| C45) | 1.7421792489E−11 |
| X**9 (SCO X9 \| C46) | 0.0000000000E+00 |
| X**8 *Y (SCO X8Y \| C47) | 2.8416565461E−13 |
| X**7 * Y**2 (SCO X7Y2 \| C48) | 0.0000000000E+00 |
| X**6 * Y**3 (SCO X6Y3 \| C49) | 7.7200373777E−13 |
| X**5 * Y**4 (SCO X5Y4 \| C50) | 0.0000000000E+00 |
| X**4 * Y**5 (SCO X4Y5 \| C51) | −6.188783932E−13 |
| X**3 * Y**6 (SCO X3Y6 \| C52) | 0.0000000000E+00 |
| X**2 * Y**7 (SCO X2Y7 \| C53) | 1.7935251959E−14 |
| X * Y**8 (SCO XY8 \| C54) | 0.0000000000E+00 |
| Y**9 (SCO Y9 \| C55) | −1.391093985E−13 |
| X**10 (SCO X10 \| C56) | −2.6923251198E−15 |
| X**9 * Y (SCO X9Y \| C57) | 0.0000000000E+00 |
| X**8 * Y**2 (SCO X8Y2 \| C58) | −1.5546422781E−14 |

TABLE 2-continued

Optical surface prescription of surface S2 of the freeform eyepiece 110

| | |
|---|---|
| X**7 * Y**3 (SCO X7Y3 \| C59) | 0.00000000000E+00 |
| X**6 * Y**4 (SCO X6Y4 \| C60) | −1.0384073178E−14 |
| X**5 * Y**5 (SCO X5Y5 \| C61) | 0.0000000000E+00 |
| X**4 * Y**6 (SCO X4Y6 \| C62) | 3.8750232363E−14 |
| X**3 * Y**7 (SCO X3Y7 \| C63) | 0.0000000000E+00 |
| X**2 * Y**8 (SCO X2Y8 \| C64) | −3.094245370E−14 |
| X * Y**9 (SCO XY9 \| C65) | 0.000000000E+00 |
| Y**10 (SCO Y10 \| C66) | −3.15607172E−14 |

For the freeform objective 120 of FIGS. 1-2, one or more of the surfaces (S4, S5, S6) in the design layout may utilize a type of freeform surface, Tables 4-5. Each of the surfaces of the freeform objective 120 was modeled as an "XY Poly" type. The term "XY Poly" refers to a surface which may be represented by the equation $$z = \frac{cr^2}{1+\sqrt{1-(1+k)c^2r^2}} + \sum_{j=2}^{66} C_j x^m y^n$$

$$j = \frac{(m+n)^2 + m + 3n}{2} + 1,$$

where z is the sag of the freeform surface measured along the z-axis of a local x, y, z coordinate system, c is the vertex curvature (CUY), r is the radial distance, k is the conic constant, and $C_j$ is the coefficient for $x^m y^n$. The optical prescriptions for these surfaces (S4 through S6) are listed in Table 4, while the surface decenters with respect to the global origin which coincides with the center of the eye box are listed in Table 5.

TABLE 4

Optical surface prescription of the freeform objective 120

| | S4 | S5 | S6 |
|---|---|---|---|
| Y Radius | −525.2 | −65 | −50 |
| k | 1.324 | −0.52 | 2.25 |
| X**2 | −0.0015 | −0.002156 | −1.387e−5 |
| Y**2 | −0.00025 | −1.55e−6 | −1.821e−5 |
| X**2 * Y | 1.5e−5 | 0.00012 | 0.000174 |

TABLE 5

Optical surface positions and orientations of the freeform objective of Table 4 with respect to the center of the objective stop

| | Origin of surface reference | | | Orientation of the surface Rotation |
|---|---|---|---|---|
| | X (mm) | Y (mm) | Z (mm) | about X-axis θ (°) |
| S4 | 0 | 0 | 3 | 5.5 |
| S5 | 0 | 0 | 12 | −20.5 |
| S6 | 0 | 18 | 9 | 65 |
| Detector* | 0 | −1 | 4 | 2 |

Note:
In Table 5, the detector coordinates are defined relative to S6, instead of the objective stop.

In another of its aspects, the present invention provides a light detector module 400, which may be particularly compact, and therefore well-suited to night vision systems. Light detector modules of the present invention are expected to provide space-saving advantage over conventional systems, which typically use a fiber bundle array or relay optics to couple an image intensifier 20 to a CCD. The use of a fiber bundle array or relay optics requires additional separation between the image intensifier and CCD, leading to an increased and undesirable size.

Exemplary light detector modules of the present invention can effect night vision imaging by measurement of visible and near infrared photons using an image intensifier in combination with a silicon based focal plane array or delta-doped CCD. In particular, in an exemplary configuration in accordance with the present invention, the light detector module 400 may include a photocathode 410, a microchannel plate (MCP) 420, a lens array 430, and a detector array 440, FIGS. 4A-5B. The process of light amplification starts when light is absorbed in the photocathode 410 and electrons are emitted. The electrons accelerate to the microchannel plate 420 which generates more electrons. The lens array 430 may be coated with a phosphor material layer 432, FIG. 4B, may be biased relative to the microchannel plate 420, so that electrons are accelerated toward the phosphor coated lens array 430 to generate light. The lens array 420 may be disposed on a substrate 435. Light generated by phosphor layer 432 may be collected by microlenses 434 of the array 430 and focused onto and detected by respective individual pixels of the focal plane array 440.

Turning to the photocathode 410 in more detail, the photocathode 410 converts incident light into electrons by the photoelectric effect. The quality of the photocathode 410 may be characterized by the quantum efficiency (QE), which is defined to be the percentage of incident photons that are converted to electrons. QE is generally wavelength dependent. Depending on the required spectral sensitivity, different photocathode materials can be used. Examples of suitable photocathode materials for use in the present invention include alkali, multi-alkali alloys (lithium, sodium, potassium, rubidium, cesium, antimony, silver) and semiconductor (GaAs, GaAsP, InGaAs, Cs—Te).

The MCP 420 may be positioned to receive electrons created by the photocathode 410. The MCP 420 then amplifies the electron signal, usually by >$10^4$ times. The MCP 420 may include a thin metal oxide coating to prevent ion feedback to the photocathode 410. Suitable MCPs for use in light modules of the present invention include LongLife™ MCP (Photonis, Sturbridge, Mass.) and F1551 MCP (Hamamatsu Photonics, Bridgewater N.J.).

After the electrons received by the MCP 420 are amplified, the resulting electrons may be accelerated by a constant voltage and subsequently collide with a phosphor material. In one exemplary configuration of the present invention, the phosphor material may be provided as a phosphor layer 432 on the microlenses 434, FIG. 4B. The transparent substrate 435 of the microlens array 430 may be biased by a positive voltage to attract the electrons. A portion of the electron kinetic energy may be converted to heat and the remaining energy absorbed by the phosphor to excite the phosphor atoms. The excited phosphor returns to the ground state by emission of light. Phosphor materials typically emit green light and may be made of rare earth oxides or halides, such as P20=$Y_2O_2S$:Eu, P43=$Gd_2O_2S$:Tb, P45=$Y_2O_2S$:Tb, P46=$Y_3Al_5O_{12}$:Ce, P47=$Y_2SiO_5$:Ce, for example. The type of phosphor may be chosen to match the peak sensitivity of the detector array and the required frame rate. High frame rates require a phosphor with short fluorescence decay time. The phosphor may be deposited by the settling process, the slurry process, the dusting process, or the phototacky process. Information about different typed of phosphor and their processing can be found in William M. Yen, et al., "Practical Applications of Phosphors," CRC Press 2007. After the electrons are converted back to photons through the excitation and de-excitation of the phosphor layer 432, the photon signal may be detected by the detector array, such as a focal plane array 440 which may be a CCD or CMOS detector array, for example, FIG. 4A.

Figure 4A:
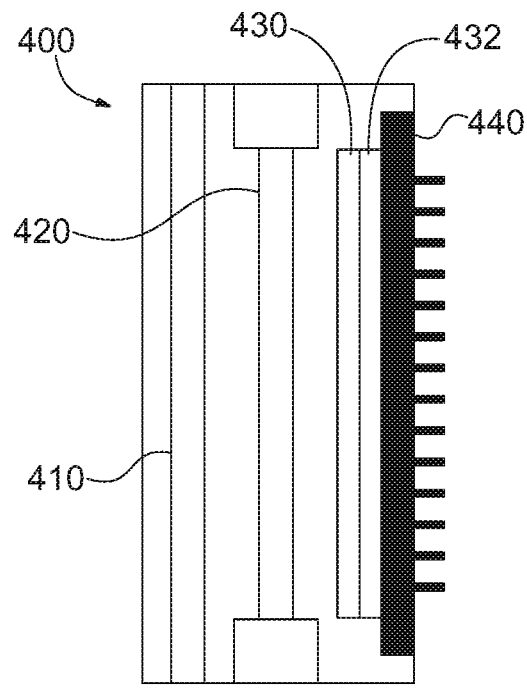
FIGS. 4A-4C schematically illustrate an exemplary configuration of a light detector module in accordance with the present invention comprising a phosphor coated microlens array and focal plane array.
Figure 4B:
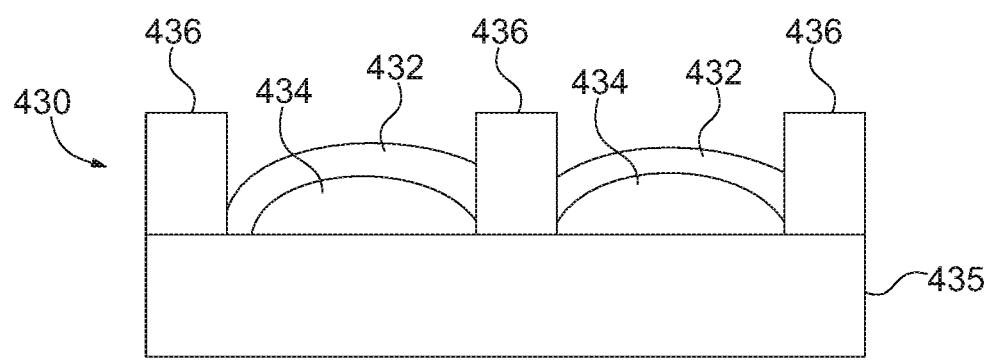
Figure 4C:
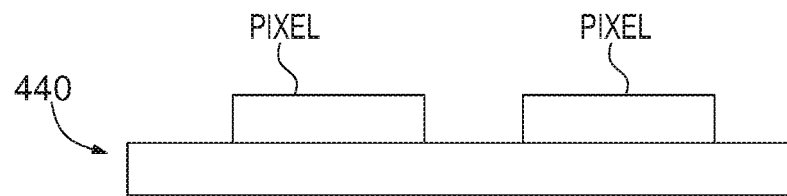

Turning to the lens array 430 more particularly, in one particularly useful configuration of the present invention, the lens array 430 may include a plurality of microlenses 434, each of which may be coated with a phosphor layer 432, FIG. 4B. The microlens array 430 may be utilized to couple light to the CCD to reduce the separation of the image intensifier (microchannel plate 420 and photocathode layer 410) and the focal plane array 440, leading to an overall more compact design. The spacing, or pitch, between microlenses 434 may be selected to correlate to the spacing or pitch between light sensing pixels in the focal plane array 440, FIG. 4C. The center of each microlens 434 of the array 430 may align with the center of the active area of a respective pixel of the focal plane array 440. By providing a microlens array 430, and matching the microlens pitch to that of the focal plane array 440, the lens array 430 may increase the optical fill factor by collecting photons proximate to each pixel, and delivering such photons into the active area of each pixel of the focal plane array 440.

The lens array 430 may be made of glass or polymer using techniques such as resist reflow, gray scale lithography, embossing, and casting. The material of the lens array 430 may desirably have low optical loss at the emission wavelength of the phosphor. A barrier structure 436 may also be provided on the lens array 430, which may include a conducting material, such as metal or semiconductor. The barrier structure 436 may remove excess charge build up on the phosphor layer 432 and separate the phosphor layer 432 into different spatial regions, such that light emitted from each spatial region is collected mainly into the single lens 434 adjacent the spatial region and respective pixel of the focal plane array 440. The barrier structure 436 may reduce pixel cross talk, by preventing light emitted from neighboring phosphor spatial regions from reaching the same pixel. The barrier structure 436 may be fabricated by conventional microfabrication techniques such as photolithography, sputtering, and etching.

In one exemplary configuration of the detector array of the present invention, the lens array 430 may be fabricated directly on top of the focal plane array 440, with a separate transparent substrate 435, phosphor layer 432, and a barrier structure 436 mounted on top. In another configuration, the detector array 440 may contain the barrier structure 436, the phosphor layer 432, and the lens array 430 directly fabricated on top of the focal plane array 440, which may be fabricated using conventional microfabrication techniques.

Figure 5A:
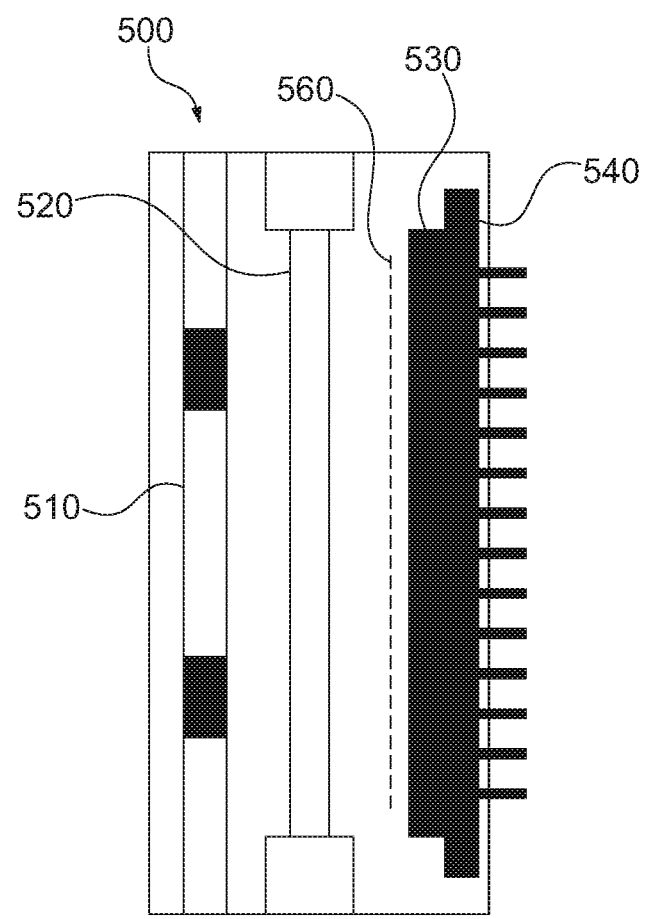
FIG. 5A schematically illustrates a further exemplary configuration of a light detector module in accordance with the present invention comprising an Einzel lens array and Faraday cup array.

In another exemplary configuration of a light detector module in accordance with the present invention, the detector module 500 may include a photocathode 510, a microchannel plate 520, and a micro Faraday cup array 540, FIG. 5A. (An example of a Faraday cup array suitable for use in the present invention may be found in U.S. Pat. No. 8,866,080 and references disclosed therein.) In this configuration, electrons coming from the microchannel plate 520 are detected by the array 540 of Faraday cups. An electrode 560, such as a mesh electrode, may be placed between the microchannel plate 520 and the Faraday cup array 540 to bias the electrons, and each Faraday cup may be connected to a transimpedance amplifier which converts the current signal to voltage signal. Further, an array of Einzel lenses 530 may optionally be placed between the microchannel plate 520 and the Faraday cup array 540 to refocus the electrons. (An example of an Einzel lens array suitable for use in the present invention may be found in US Patent Application Publication 2013/0341526. See also Tomono et al., "Fabrication of Einzel Lens Array with One-Mask RIE Process For Electron Micro-Optics," Solid-State Sensors, Actuators and Microsystems Conference, 2009. TRANSDUCERS 2009.) Similar to the configuration of FIG. 4A, the size and pitch of the lenses of the Einzel array 530 may be matched to the size and pitch of the array 540 of Faraday cups.

Figure 5B:
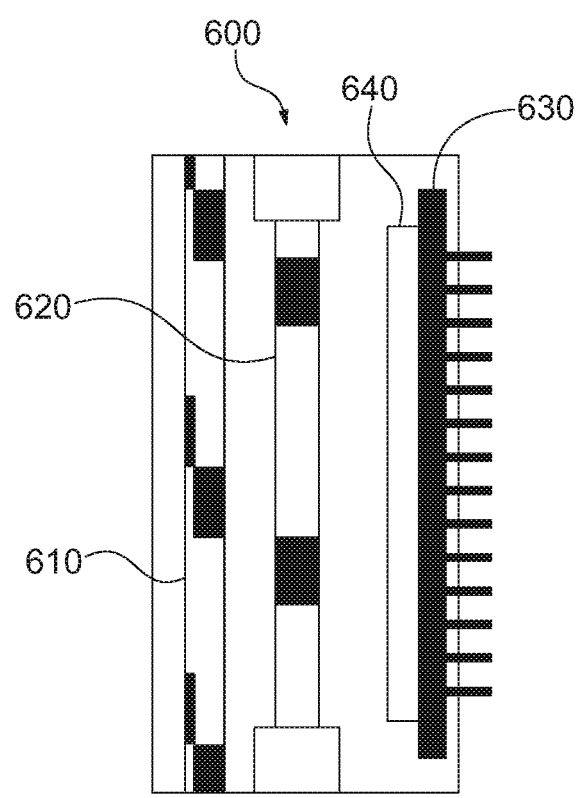
FIG. 5B schematically illustrates an exemplary configuration of a light detector module in accordance with the present invention comprising an Einzel lens array and a delta-doped charge-coupled device.

In yet another exemplary configuration of a light detector module in accordance with the present invention, the detector module 600 may include a photocathode 610, a microchannel plate 620, and a delta-doped CCD 630, FIG. 5B. An example of a delta-doped charge-coupled device suitable for use in the present invention is FastCamera 300 (FastVision LLC, Nashua, N.H.). Electrons from the microchannel plate 620 may be detected directly by each pixel at the delta-doped CCD 630. An electrode and/or array of Einzel lenses 640 may be placed between the microchannel plate 620 and the delta-doped CCD 630 to bias or refocus the electrons. The size and pitch of the lenses of the Einzel array 640 may be matched to the size and pitch of the delta-doped CCD 630. Alternatively a delta-doped silicon p-i-n diode array may be used instead of the delta-doped CCD 630 to directly detect and image low energy electrons. (See Nikzad, et al., "Direct detection and imaging of low-energy electrons with delta-doped charge-coupled devices," Applied Physics Letters, Volume 73, p. 3417, 1998. Nikzad et al., "Direct detection of 0.1-20 keV electrons with delta doped, fully depleted, high purity silicon p-i-n diode array," Applied Physics Letters, Volume 89, p. 182114, 2006). Other charge detectors, such as a MEMS electrometer array, may also be used.

Moreover, any of the light detector modules disclosed herein, such as those illustrated in FIGS. 4A-5B may be used as the image intensifier 20 in the designs of FIGS. 1-3.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

A number of patent and non-patent publications are cited herein; the entire disclosure of each of these publications is incorporated herein by reference.

What is claimed is:

1. A compact light detector module for night vision imaging, comprising from a first end to a second end:

a photocathode configured to receive light and convert the received light to electrons emitted therefrom, a microchannel plate positioned to receive the electrons emitted from the photocathode and to emit additional electrons in response thereto, a lens array comprising a plurality of microlenses, each lens conformally coated with a phosphor layer and positioned to receive electrons from the microchannel plate, the phosphor layer structured to convert electrons to light which is focused by the microlenses, a plurality of barriers disposed on the lens array, each barrier disposed between an adjacent pair of microlenses and extending along an optical axis of each lens towards the microchannel plate a distance greater than a sag of the respective adjacent microlenses to deter light emitted by a phosphor layer on a first microlens of the plurality of microlenses from reaching a second microlens of the plurality of microlenses, and a detector array where each element of the detector array is disposed in registration with a respective microlens of the lens array to receive the focused light therefrom.

2. The compact light detector module according to claim 1, wherein the detector comprises a Faraday cup array.

3. The compact light detector module according to claim 1, wherein the detector comprises a focal plane array.

4. The compact light detector module according to claim 1, wherein the phosphor layer is biased relative to the microchannel plate, so that electrons are accelerated from the microchannel plate toward the phosphor coated lens array.

5. The compact light detector module according to claim 1, wherein the detector comprises a delta-doped CCD.

6. The compact light detector module according to claim 1, wherein the detector comprises an electrometer array.

7. The compact light detector module according to claim 1, wherein the plurality of barriers comprises a conducting material.

8. The compact light detector module according to claim 7, wherein the plurality of barriers is disposed in contact with the phosphor layer to remove excess charge build up on the phosphor layer.

9. The compact light detector module according to claim 1, wherein the plurality of barriers is configured to separate the phosphor layer of each lens into different spatial regions, such that light emitted from each spatial region is collected mainly into a single lens adjacent the spatial region and respective pixel of the detector array.

* * * * *